July 13, 1954
D. BLITZ
2,683,855
FREQUENCY CONVERTER
Filed Nov. 30, 1949
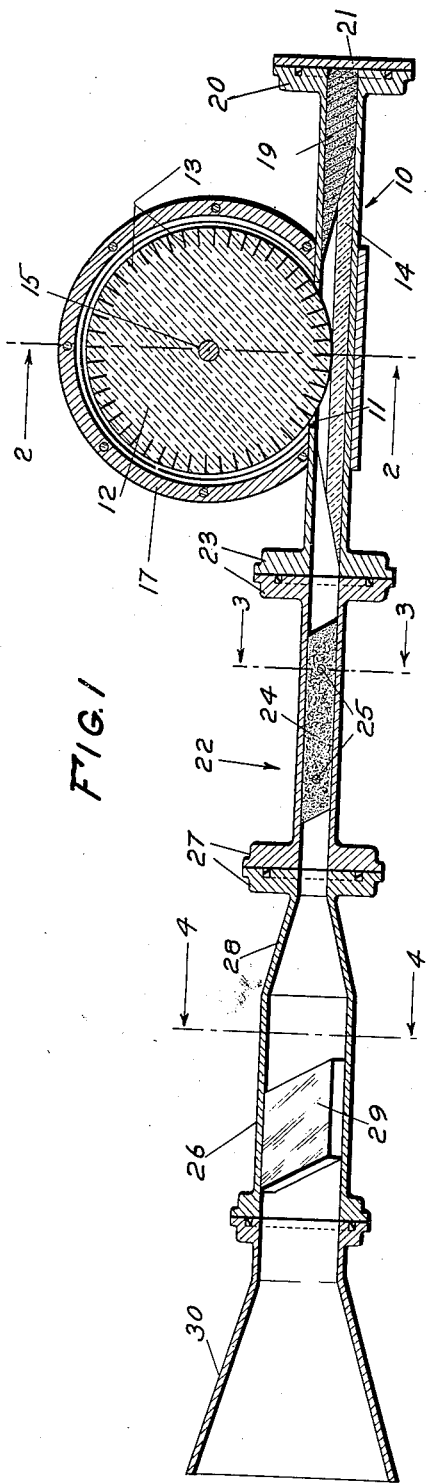
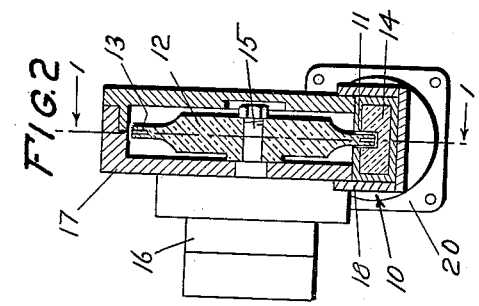
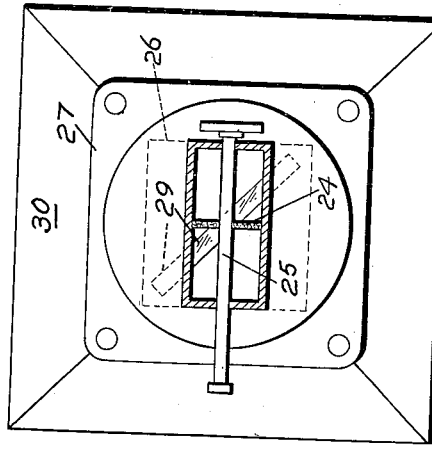
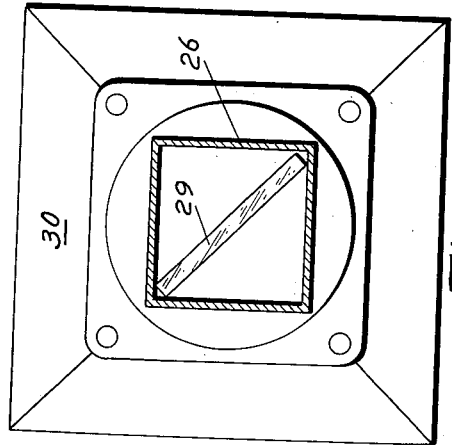
INVENTOR
DANIEL BLITZ
BY Elmer J. Gorn
ATTORNEY Patented July 13, 1954

2,683,855

UNITED STATES PATENT OFFICE 2,683,855

FREQUENCY CONVERTER

Daniel Blitz, Boston, Mass., assignor to Raytheon Manufacturing Company, Newton, Mass., a corporation of Delaware Application November 30, 1949, Serial No. 130,239

5 Claims. (Cl. 321—60)

This invention relates to apparatus for producing changes in frequency and is particularly useful in the microwave range where conventional frequency converters are not usable due to their failure to distinguish between frequencies which are close together.

In the testing of devices utilizing reflected signals, such as altimeters or radar equipment of the frequency-modulated, continuous-signal emission type, it is desirable to have a target which has a known attenuation. Furthermore, if the target is to be placed near the equipment to be tested or the transmitter is unmodulated as in a doppler detection radar, the target must create a frequency shift so that the returning wave will beat with the incident wave in the equipment to produce a signal which may be amplified and measured. If the target amplitude modulates the reflected signal, both upper and lower sidebands of the incident signal are returned to the equipment. The result is extreme sensitivity of the equipment being tested to the fractional wave length spacing between the equipment and the target, the detected signal attenuating completely every quarter wave length.

Applicant has devised a device which will act as an artificial target and produce a certain predetermined frequency shift in the reflected wave, with all frequencies other than the particular shifted frequency being absorbed by the target. This device is basically a reflector comprising a rotating wheel having attached to the periphery thereof a plurality of reflecting elements. The wheel has its periphery inserted into a slot in a wave guide which comprises a signal translation means, said slot being parallel to the axis of the wave guide such that the reflecting elements move axially along the wave guide. A wave traveling down the wave guide will be reflected by the reflecting elements which, by their movement relative to the wave guide, will produce a doppler effect on the reflected wave. Since this doppler effect is a continuously changing phase between the incoming and reflected wave, the net result is a shift in the frequency of the reflected wave. The magnitude of the frequency shift will be proportional to the speed of the rotating wheel.

Applicant has further ascertained that, by positioning material which has a high dielectric constant in the wave guide, the velocity of the wave in the guide may be reduced with a resultant increase in the frequency shift for a given rotational speed of the wheel.

Applicant further provides absorbing material behind the reflector whereby any energy which is not reflected by the reflector itself will be absorbed, thereby preventing reflection of unwanted frequencies by other parts of the device.

In addition, applicant provides a variable attenuating section in the wave guide prior to the reflecting wheel whereby the proportional amount of energy reflected by the device may be controlled.

Further, applicant has devised a polarized phase-shifting device which is positioned in the wave guide in front of the reflecting wheel, the net effect of which is to make the reflecting device reflect the same amount of energy irrespective of the plane of polarization of the incident wave.

The particular details of a structure embodying these advantageous results will now be described, reference being had to the accompanying drawing wherein:

Fig. 1 illustrates a longitudinal, cross-sectional view of a structure embodying this invention taken along line 1—1 of Fig. 2;

Fig. 2 illustrates a transverse, cross-sectional view of the device shown in Fig. 1 taken along line 2—2 of Fig. 1 and illustrating the details of the reflecting wheel;

Fig. 3 illustrates a cross-sectional view of the device shown in Fig. 1 taken along line 3—3 of Fig. 1, showing the details of the variable attenuator; and Fig. 4 illustrates a transverse, cross-sectional view of the device shown in Fig. 1 taken along line 4—4 of Fig. 1, illustrating the details of the phase shifter.

Referring now to Figs. 1 and 2, there is shown a wave guide structure 10 capable of transmitting a wave in the TE$_{01}$ mode and having a longitudinal slot 11 therein. Slot 11 is positioned in the center of the upper wider side of the wave guide 10 which, as shown here, is rectangular in form. Slot 11 is positioned parallel to any flow of current so that it has little effect on the transmission properties of the TE$_{01}$ mode in structure 10. Extending into slot 11 is a disk wheel 12 which may be made of any desired low-loss insulating material such as, for example, polystyrene. Extending radially inwardly from the periphery of wheel 12 is a plurality of metallic conductors 13. The elements 13 are spaced from adjacent elements by a distance substantially equal to a half wave length of the frequency to be reflected.

The wave length has been shortened considerably from the air-filled guide wave length by inserting in the wave guide a block 14 of material having a high dielectric constant. Block 14 fills the wave guide at the point where wheel 12 extends thereinto except for a narrow slot into which the wheel 12 fits. There is sufficient clearance between the wheel 12, the slot 11 and the slot in block 14 to allow the wheel 12 to rotate freely. The wave length in an air-filled guide is greater than that of free space, but, since the dielectric constant of block 14 is high, the velocity of a wave propagated therethrough is substantially less than the velocity of a wave in free space. By way of example, a signal with a free space wave length of 3.0 centimeters will have a wave length of 3.9 centimeters in a wave guide 0.9 of an inch wide. Introducing a block made of a mixture of mica and fused glass and having a dielectric constant of 7.8 will reduce the wave length in the guide to 1.1 centimeters. Wheel 12 is supported by a shaft 15 attached to a motor 16. As shown here, motor 16 is attached to a housing 17 which surrounds the portion of wheel 12 not in wave guide 10, housing 17, in turn, being attached to wave guide 10 by a plurality of clamping members 18. The axis of shaft 15 is perpendicular to the axis of wave guide 10 and the periphery of wheel 12 which extends into wave guide 10 is substantially tangent to the axis of wave guide 10. Since the elements 13 are spaced a half-wave length apart, they will cause reflections from an incoming wave which will be in phase, and therefore will aid to reflect a signal as if from a single reflecting element. As shown here the wheel 12 has a large number of conducting elements thereon, for example, 48 in number, so that there will always be several elements in the wave guide at any time, and therefore the entering or leaving of an element will cause substantially no change in the amplitude of the reflected signal.

The ends of the dielectric block 14 have been tapered to thereby reduce the impedance mismatch between the dielectric block and the wave guide. In order to absorb any energy which is not reflected by elements 13, a block of absorbing material 19 is placed in the guide 10 behind dielectric block 14. It has been found that a mixture of asbestos and Portland cement, known as "Transite," will absorb substantially all of the unreflected energy. The junction between the dielectric block 14 and the "Transite" block 19 is tapered to further reduce impedance mismatch between the two blocks whose impedances are already relatively well matched because their dielectric constants are of the same order of magnitude. The wave guide behind absorbing block 19 is terminated by a standard wave guide connector 20 having a plate 21 bolted thereto.

In order to vary the percentage of the incident wave in the wave guide which is reflected, a variable attenuator is placed in the wave guide in front of the dielectric block 14 and reflecting wheel 12. The variable attenuator, shown here diagrammatically, comprises a section of wave guide 22 connected to wave guide 10 by standard wave guide flange fittings 23. Inside wave guide section 22 there is positioned a body of absorbing material 24. This body 24, as shown here, comprises a sheet of insulating material, such as cardboard, covered with carbon. The sheet is positioned parallel to the shortest sides of the wave guide 22 and therefore is parallel to the electrostatic lines of a $TE_{01}$ wave traveling down the guide. As shown here, the body 24 is supported on a pair of rods 25 which extends through the wave guide 22 perpendicular to the narrow sides thereof and slidably supported therein. The body 24 is rigidly attached to the rods 25 so that, by movement of the rods 25, the position of the body 24 may be varied from the center of the guide to the side thereof. Since the electrostatic lines are strongest in the center of the guide, attenuation will be greatest when the body 24 is positioned at that point, the attenuation being reduced as the body is moved toward the side of the guide. Thus it may be seen that by calibrating the position of the body 24 in the guide 22 a wide range of calibrated attenuation of the reflected signal may be produced at will by moving rods 25.

In order to make the reflected signal insensitive to variations in the polarization of the incoming wave, applicant has devised a polarized phase-shifting device which will reflect the same relative magnitude of signal irrespective of the polarization of the incoming wave. This phase shifter comprises a section of wave guide 26 attached to the wave guide section 22 by standard flange connections 27. Wave guide 26 has a cross section which is substantially square with the width of the sides being substantially equal to the widest side of wave guide section 22. Wave guide section 26 is connected to wave guide 22 by a tapered section 28 wherein two of the walls of the rectangular section are tapered inwardly until the dimension of the narrow side of the wave guide 22 is reached at the flange connections 27. Positioned in square wave guide section 26 is a sheet of dielectric material 29 which may be, for example, polystyrene, whose plane is parallel to a diagonal of the square cross section of guide 26 and the axis of the guide. The length of polystyrene member 29 is such that the component of a wave which is parallel to the plane of sheet 29 will be retarded a quarter cycle more than the component of a wave which is perpendicular to sheet 29 during the time that both waves pass down the wave guide through the region occupied by member 29. A signal which is horizontally polarized, for example, upon traveling through phase-shifting sheet 29, will have a component which is retarded and a component which is unretarded, said components being at right angles to each other, with the result that the wave incident upon wave guide tapered section 28 will vary in polarization throughout all phases thereof, thereby constituting what is known as a circularly-polarized wave. As shown here, both elements 29 and 24 have tapered ends to reduce the mismatch between these elements and the guide. Since wave guide section 22 will transmit only vertically-polarized waves, only half of the power of the circularly-polarized wave will enter wave guide 22. The remainder of the energy is substantially shorted out by the tapered section 28. In order to prevent an unduly large mismatch between the horizontally-polarized portions of the wave and the tapered section 28 which might cause undesirable reflections, a resistive load may be placed, if desired, in tapered section 28, which will absorb horizontally-polarized energy. This load might be in the form of a resistive card parallel to wide sides of guide 22 or a resistive coating placed directly on the tapered sides of tapered member 28. The vertically-polarized wave will travel down wave guide 22, having a certain predetermined amount of attenuation dependent upon the position of member 24, and then be substantially reflected by the conducting members 13 of wheel 12. This reflected wave then travels back through guide 22 and is again attenuated by the same predetermined proportional amount and enters the wave guide 26. Upon passing through phase-shifting member 29 it becomes again circularly polarized. This wave then being radiated to the instrument to be tested is picked up by an antenna thereon having any polarization with the same intensity. Similarly, a wave of any other polarization incident upon the phase-shifting member 29 will have, upon passing through phase-shifting member 29, a vertically-polarized component containing substantially half the power of the incident wave, and the reflected wave shown repassing through phase shifter 29 will be radiated in circular polarized form, the instrument being tested receiving signals of an intensity independent of the instrument's polarization. The phase shifter may be omitted when testing a device operating with circular polarization.

Connected to the input end of wave guide 26 is a radiating horn 30 shown here, by way of example, as one means of coupling the reflecting device to an instrument to be tested. However, it is to be clearly understood that the device may be connected through to the instrument to be tested without being radiated through free space. Thus it may be seen that applicant has devised a reflecting device capable of producing a variably attenuated reflecting signal, the magnitude of which is independent of the plane of polarization of the incident wave of the antenna structure of the instrument propagating and/or receiving the signal.

The amount by which the reflecting wheel 12 shifts the frequency of the incident wave is equal to the number of half wave lengths per second that element 13 travels along the dielectric-filled guide. For example, if the wheel is rotating at 200 R. P. S. and there are 48 conducting elements in the periphery thereof, spaced one half wave length apart in the dielectric-filled guide, each element travels 9600 half wave lengths per second and the frequency of the reflected wave will be shifted 9600 cycles per second from the incident wave. If the wheel is rotated so that the conducting elements 13 which are in the wave guide move in the same direction as the incident wave, the frequency will be shifted downward while, if the conducting elements move opposite to the direction of the incident wave, the frequency will be shifted upward. Since any energy which is not reflected by the pins 13 and thereby shifted in frequency is absorbed, only the shifted frequency is reradiated by the horn 30, thereby effectively separating the shifted frequency from the original frequency. Thus it may be seen that applicant has produced a polarization insensitive, frequency-converting device which is useful at microwave frequencies to simulate the doppler effect caused by an approaching or receding reflector.

This completes the description of the specific embodiment of the invention described herein. However, many modifications thereof will be apparent to persons skilled in the art without departing from the spirit and scope of this invention. For example, other supports for the movable reflectors may be used besides the rotating wheel such as, for example, a flexible belt, and frequency conversion may be obtained without the use of the phase shifter 29 and the attenuator 24. In addition, other shapes of wave guides than the rectangular ones shown may be used and other dielectrics besides the block 14 may be used to slow the wave or indeed the wave may be reflected without reducing its velocity. Therefore, applicant does not wish to be limited to the particular details of the embodiment of the invention disclosed herein except as defined by the appended claims.

What is claimed is:

1. A frequency converter comprising a source of electrical signals, signal translation means coupled to said source, signal reflecting means coupled to said translation means, said reflecting means comprising a plurality of spaced reflecting elements, adjacent elements of said reflecting means being separated with substantially nonreflecting means by a distance equal to substantially a multiple of a half wave length of the frequency of said signals in the medium containing said reflecting elements, and means for producing a continuous component of motion relative to said source of said reflecting means in a direction parallel to the direction of incidence of said signals on said reflecting means.

2. A frequency converter comprising a source of electrical signals, a wave guide coupled to said source, signal reflecting means coupled to said wave guide comprising a plurality of spaced reflecting elements, adjacent elements of said reflecting means being separated by a distance equal to substantially a multiple of a half wave length of the frequency of said signals in the medium containing said reflecting elements, means for substantially reducing the velocity of said signals in said wave guide between said reflecting elements, and means for producing a continuous component of motion relative to said source of said reflecting means in a direction parallel to the direction of incidence of said signals on said reflecting means.

3. A frequency converter comprising a source of electrical signals, signal translation means coupled to said source, signal reflecting means coupled to said translation means comprising a plurality of spaced reflecting elements separated by a substantially nonreflecting medium, adjacent elements of said reflecting means being separated by a distance equal to substantially a multiple of a half wave length of the frequency of said signals in the medium containing said reflecting elements, and an energy-absorbing medium associated with said reflecting means for absorbing unreflected energy.

4. A frequency converter comprising a source of electrical signals, a wave guide coupled to said source, signal reflecting means coupled to said wave guide, said reflecting means comprising a plurality of spaced reflecting elements, adjacent elements of said reflecting means being separated by a distance equal to substantially a multiple of a half wave length of the frequency of said signals in the medium containing said reflecting elements, means for substantially reducing the velocity of said signals in said wave guide between said reflecting elements, an energy-absorbing medium associated with said reflecting means for absorbing unreflected energy, and means for producing a continuous component of motion relative to said source of said reflecting means in a direction parallel to the direction of incidence of said signals on said reflecting means.

5. A frequency converter comprising a source of electrical signals, signal reflecting means comprising a plurality of reflecting elements, adjacent elements of said reflecting means being separated by a distance equal to substantially a multiple of a half wave length of the frequency of said signals in the medium containing said reflecting elements, an attenuator and a polarized phase shifter interposed between said source and said reflecting means, means for substantially reducing the wave length of said signals between said reflecting elements and means for producing a continuous component of motion relative to said source of said reflecting means in a direction parallel to the direction of incidence of said signals on said reflecting means.

References Cited in the file of this patent

UNITED STATES PATENTS

| Number | Name | Date |
|---|---|---|
| 2,206,683 | Wolff | July 2, 1940 |
| 2,398,606 | Wang | Apr. 16, 1946 |
| 2,400,777 | Okress | May 21, 1946 |
| 2,403,289 | Korman | July 2, 1946 |
| 2,427,098 | Keizer | Sept. 9, 1947 |
| 2,430,568 | Hershberger | Nov. 11, 1947 |
| 2,491,542 | Woodyard et al. | Dec. 20, 1949 |
| 2,505,557 | Lyman | Apr. 25, 1950 |
| 2,542,185 | Fox | Feb. 20, 1951 |
| 2,602,857 | Hewitt | July 8, 1952 |
| 2,611,087 | Alford | Sept. 16, 1952 |

FOREIGN PATENTS

| Number | Country | Date |
|---|---|---|
| 605,300 | Great Britain | July 20, 1948 |

OTHER REFERENCES

Publication I, "Microwave Transmission Circuits," edited by Ragan, Radiation Laboratory Series, vol. 9, published by McGraw-Hill. Pages 372 and 514 relied on. Copy in Div. 69.